(12) United States Patent
Vogt

(10) Patent No.: US 6,414,260 B1
(45) Date of Patent: Jul. 2, 2002

(54) WELDING ELECTRODE WITH AN ARRANGEMENT FOR INTRODUCING ULTRASOUND IN ORDER TO CHECK WELD JOINTS

(76) Inventor: Göran Vogt, Ehlbeek 15, D-30938 Burgwedel (DE)

( * ) Notice: Subject to any disclaimer, the term of this patent is extended or adjusted under 35 U.S.C. 154(b) by 0 days.

(21) Appl. No.: 09/647,682
(22) PCT Filed: Mar. 27, 1999
(86) PCT No.: PCT/EP99/02119
 § 371 (c)(1),
 (2), (4) Date: Dec. 4, 2000
(87) PCT Pub. No.: WO99/51384
 PCT Pub. Date: Oct. 14, 1999

(30) Foreign Application Priority Data

Apr. 3, 1998 (DE) .......................... 198 15 041

(51) Int. Cl.[7] ...................... B23K 11/25; G01H 17/00; G01N 29/04
(52) U.S. Cl. .................. 219/109; 73/582; 73/588
(58) Field of Search ............ 219/109; 73/582, 73/588; 228/104

(56) References Cited

U.S. PATENT DOCUMENTS

| | | | |
|---|---|---|---|
| 3,384,733 A | | 5/1968 | Burbank et al. ............ 219/109 |
| 3,410,983 A | * | 11/1968 | Deutsch et al. |
| 3,487,191 A | | 12/1969 | Class ......................... 219/119 |
| 4,472,620 A | * | 9/1984 | Nied |
| 4,596,917 A | * | 6/1986 | Nied et al. |
| 4,711,984 A | * | 12/1987 | Bilge et al. |
| 4,734,555 A | * | 3/1988 | Ferguson |
| 4,918,990 A | * | 4/1990 | Fowler et al. |
| 5,541,382 A | * | 7/1996 | Taylor et al. |
| 5,552,573 A | | 9/1996 | Okita et al. .................. 219/118 |
| 5,920,014 A | * | 7/1999 | Wasckies |
| 6,072,144 A | * | 6/2000 | Perryman |
| 6,297,467 B1 | * | 10/2001 | Maev et al. |

FOREIGN PATENT DOCUMENTS

| | | |
|---|---|---|
| AU | 571116 | 5/1986 |
| DE | 2655415 | 10/1979 |
| DE | 4325858 | 7/1995 |
| EP | 0248177 | 6/1993 |
| GB | 2317700 A * | 4/1998 |

OTHER PUBLICATIONS

Waschkies, Eckhard, "Prüfen des Widerstands–punktsch–weissprozesses mit Ultraschall", Schweissen & Schneiden, 49(1997) Heft 1 pp. 15, 17, 19.

Deutsch, Von Volker, "Zerstörungsfreie Prüfverfahren etc.", ZIS–Mitteilungen, Heft 1/68, pp. 63–75.

* cited by examiner

Primary Examiner—Tom Dunn
Assistant Examiner—Kiley Stoner
(74) Attorney, Agent, or Firm—Flanagan & Flanagan; John R. Flanagan

(57) ABSTRACT

A welding electrode with a configuration (2) for the ultrasound introduction for the testing of weld joints, in particular resistance welded joints, comprises an ultrasound transmitter for the impingement of the welding region with ultrasonic waves and an ultrasound receiver disposed at a spacing from the welding region, for the reception of the ultrasonic waves passed through the welding region. To provide a welding electrode which is simple in structure, which is suitable for an impingement of the welding region with longitudinal ultrasonic waves, the ultrasound transmitter radiates the ultrasonic waves axially into the welding electrode (4) or axially or obliquely into a channel (42) of the welding electrode which is filled with a medium transmitting sound.

10 Claims, 1 Drawing Sheet

WELDING ELECTRODE WITH AN ARRANGEMENT FOR INTRODUCING ULTRASOUND IN ORDER TO CHECK WELD JOINTS

BACKGROUND OF THE INVENTION

1. Field of the Invention

The invention relates to a welding electrode with a configuration for the introduction of ultrasound for the testing of weld joints.

2. Description of the Prior Art

Testing resistance welded joints by means of ultrasound is generally known, for example through the technical journal "Schweißen & Schneiden", 1997, No. 1, pp. 15. Herein the welding region, thus that region of the workpiece to be welded, onto which the welding electrodes act, is impinged with ultrasonic waves from an ultrasound transmitter. The ultrasonic waves, either after permeation through the welding region or after reflection on this welding region, are received by means of an ultrasonic receiver. By evaluating the received ultrasonic waves conclusions can be drawn regarding the temperature course in the workpiece to be welded and the growth of the welding spot. It is herein especially advantageous that the testing of the weld joint takes place still during the welding process such that parameters of the welding process, for example the welding current or the welding time, can be adapted as a function of the evaluation of the received ultrasonic signals. In this way defective weld joints are reliably avoided.

Through EP 02 48 177 a configuration for the introduction of ultrasound in the testing of resistance welded joints is known, which comprises welding electrodes with electrode caps and an ultrasound transmitter for acting upon the welding region with ultrasonic waves. The ultrasound transmitter is disposed on the inside on the bottom of the electrode cap and generates ultrasound signals with a frequency of approximately 5 MHz. The ultrasound signals are received by an ultrasound receiver after their permeation through the welding region, which receiver is disposed inside the electrode cap of a welding electrode which during the welding process is disposed oppositely. Similar configurations are also known through U.S. Pat. No. 3 384 733 and DE-AS 2,655,415.

A disadvantage of the known configurations comprises that when replacing the electrode cap which represents a wearing part, the ultrasound transmitter must be removed and attached on the new electrode. This is time consuming and involves expenses.

A further disadvantage of the known configurations comprises that the electric feed lines for the ultrasound transmitter must be guided through the entire electrode shaft up to the electrode cap, which is made difficult thereby that a large portion of the inner volume of the electrode shaft, as a rule, is taken up by feed lines for cooling means for cooling the electrode cap, such that for the electric feed lines not much space is available. In addition, the electric feed lines of the ultrasound transmitter must be insulated against the cooling water and the ultrasound transmitter must be sealed against the penetration of cooling water. The same disadvantages relate to the ultrasound receiver disposed in corresponding manner within the other welding electrode.

Through DE 43 25 858 C2 a configuration is known of the relevant type for the introduction of ultrasound in the testing of resistance welded joints, which comprises a welding electrode having an electrode cap and an ultrasound transmitter disposed remote from the electrode cap, for impinging the welding region with ultrasonic waves. In the known configuration the ultrasound transmitter is attached on the outer electrode shaft of the electrode or on an electrode holder of the welding electrode and impinges the welding region with shear waves. By attaching the ultrasound transmitter on the outer electrode shaft or on the electrode holder the structure of the known configuration is indeed simplified.

However, one disadvantage comprises that in the known configuration due to the coupling of the sound waves from the outer surface of the electrode the impingement of the welding region with longitudinal ultrasonic waves is not possible since herein a damping of the longitudinal ultrasonic waves would occur to a considerable degree and would make difficult the evaluation of the ultrasonic waves after their permeation through the welding region or their reflection on this welding region.

BRIEF SUMMARY OF THE INVENTION

The invention is based on the task of specifying a welding electrode which is simple in structure and which is suitable for an impingement of the welding region with longitudinal ultrasonic waves.

The teaching according to the invention builds first on the recognition that within the scope of a simple structure of the welding electrode it is of advantage if the ultrasound transmitter is disposed spaced apart from the welding region. Building hereon, the fundamental concept of the teaching according to the invention comprises irradiating the ultrasonic waves axially into the welding electrode or axially or obliquely into a channel of the welding electrode which is filled with a sound-transmitting medium. In this way an impingement of the welding region is also possible with longitudinal ultrasonic waves without attenuations of the ultrasonic waves occurring to such a degree that the evaluation of the ultrasonic waves is impaired after their permeation through the welding region or their reflection on this welding region.

By the disposition of the ultrasound transmitter spaced apart from the welding region, the structure of the device according to the invention is simply formed since it is not required to lead the electric feed lines of the ultrasound transmitter up to the electrode tip or cap.

The development according to the invention permits in simple and precise manner an impingement of the welding region with ultrasonic waves and by evaluating the ultrasonic waves after permeation through the welding region or reflection on this welding region, the testing of the weld joint during or after completion of the welding process and a control of the parameters of the welding process as a function of this evaluation. In this way, defective weld joints are avoided or at least decreased. This saves time- and thus cost-intensive finishing or reworking.

The welding electrode can therein be developed for example integrally and with a pocket bore as the channel or in two components comprising an electrode shaft with a continuous bore as a channel and an electrode cap.

An ultrasound receiver for the reception of the ultrasonic waves after permeation through the welding region or reflection on this welding region can be formed as a separate element apart from the configuration. According to a further development of the teaching according to the invention, the configuration comprises, however, an ultrasound receiver for the reception of ultrasonic waves after permeation through the welding region or reflection on this welding region. In this embodiment the impingement of the welding region with ultrasonic waves as well as also the reception of the ultrasonic waves takes place through the configuration according to the invention, which can additionally comprise an evaluation unit for evaluating the signals received by the ultrasound receiver.

In principle, the ultrasound transmitter can be separated from the channel into which it irradiates the ultrasonic waves by a component of the configuration, provided it is ensured that the damping of the ultrasonic waves during the passing through this component are kept in limits, within which, in the required manner, an evaluation of the ultrasonic waves is still possible after their permeation through the welding region or reflection on this welding region. An especially advantageous further development of the teaching according to the invention provides that the ultrasound transmitter is directly connected with the channel. In this way a damping of the ultrasonic waves before their entrance into the channel is avoided. This permits a precise evaluation of the ultrasonic waves.

The ultrasound transmitter can, in principle, be disposed at any desired site provided the irradiation of the ultrasonic waves into the channel in the required manner is ensured.

The configuration usefully comprises an ultrasound receiver for the reception of ultrasonic waves after their permeation through the welding region or their reflection on this welding region.

According to an embodiment the ultrasound transmitter and/or the ultrasound receiver are at least partially received in an electrode holder of the welding electrode or a component connected therewith. In this way the structure of the configuration is implemented such that it is compact and robust. In addition, the ultrasound transmitter, due to its disposition in the electrode holder or a component connected therewith, is protected against mechanical damage during the handling of the electrode holder with the welding electrode. The channel extends usefully through the electrode holder and/or a component connected therewith and/or an electrode shaft of the welding electrode.

Another advantageous further development of the teaching according to the invention provides that the ultrasound transmitter is disposed relative to the channel such that the ultrasonic waves propagate substantially in the axial direction of the channel. In this way undesirable reflections or dampings of the ultrasonic waves are avoided, which can occur if the direction of propagation of the ultrasonic waves extends at an angle to the walls of the channel.

Disposition and geometry of the channel are selectable within broad limits. An advantageous further development provides that the channel has substantially a constant cross section over its entire length. In this way the same propagation conditions for the ultrasonic waves are attained over the entire length of the channel. The channel can also be developed conically or be bent or angled.

In the above described embodiment the channel can be formed in a portion with a cylindrical inner wall, as is provided by a useful further development.

According to an especially advantageous further development of the teaching according to the invention, the channel is at least partially formed by the electrode holder and/or by a component connected with the electrode holder and/or by a tube component extending through the electrode shaft for supplying cooling means to the inside of the electrode cap and/or for the outlet of cooling water from the inside of the electrode cap. In this embodiment the ultrasonic waves are supplied to the welding electrode via the cooling water path of the welding electrode.

The ultrasound transmitter and/or the ultrasound receiver are usefully connected detachably with the electrode holder. In this embodiment a replacement of a defective ultrasound transmitter as well as also the removal of the ultrasound transmitter from a defective electrode holder is made possible.

With the above embodiment the electrode holder can comprise on its side facing away from the electrode cap at least one recess connected with the channel, preferably accessible from the outside of the configuration, for the reception of the ultrasound transmitter and/or of the ultrasound receiver. In this way, the production of the configuration according to the invention and an access to the ultrasound transmitter, for example for replacing it, is simplified.

A useful further development of the above embodiment provides that the recess is coaxial with the longitudinal axis of the channel. In this way, for example when a propagation of the ultrasonic waves is required in the axial direction of the channel, the assembly of the configuration according to the invention is simplified, since through the position of the recess relative to the longitudinal axis of the channel the position of the ultrasound transmitter is preset relative to the channel.

A further development of the embodiment with the recess provides that the ultrasound transmitter and/or the ultrasound receiver is/are adhered or plugged into this recess or are screwed with outer threads into inner threads of the recess.

In principle the ultrasound transmitter can generate any desired, preset type of ultrasonic waves. However, the ultrasound transmitter advantageously impinges the welding region with longitudinal ultrasonic waves. In this way the evaluation of the ultrasonic waves received by an ultrasound receiver after permeation through the welding region or reflection on this welding region, is simplified.

The wavelength of the ultrasonic waves is selectable within broad limits. However, usefully the wavelength of the ultrasonic waves is approximately 5 to approximately 25 MHz.

A further development of the above embodiment provides that the ultrasound receiver relative to the welding region is disposed at the ultrasound transmitter side. In this embodiment the ultrasound receiver receives the ultrasonic waves reflected on the welding region.

According to a further implementation of the invention the ultrasound receiver is contained together with the ultrasound transmitter in a test head. Hereby an especially compact structure can be attained. The ultrasound receiver and the ultrasound transmitter can also be disposed separately in two test heads.

BRIEF DESCRIPTION OF THE DRAWINGS

In the following the invention will be explained in further detail in conjunction with the drawing in which embodiment examples are depicted as follows.

DETAILED DESCRIPTION OF THE INVENTION

Figure 1:
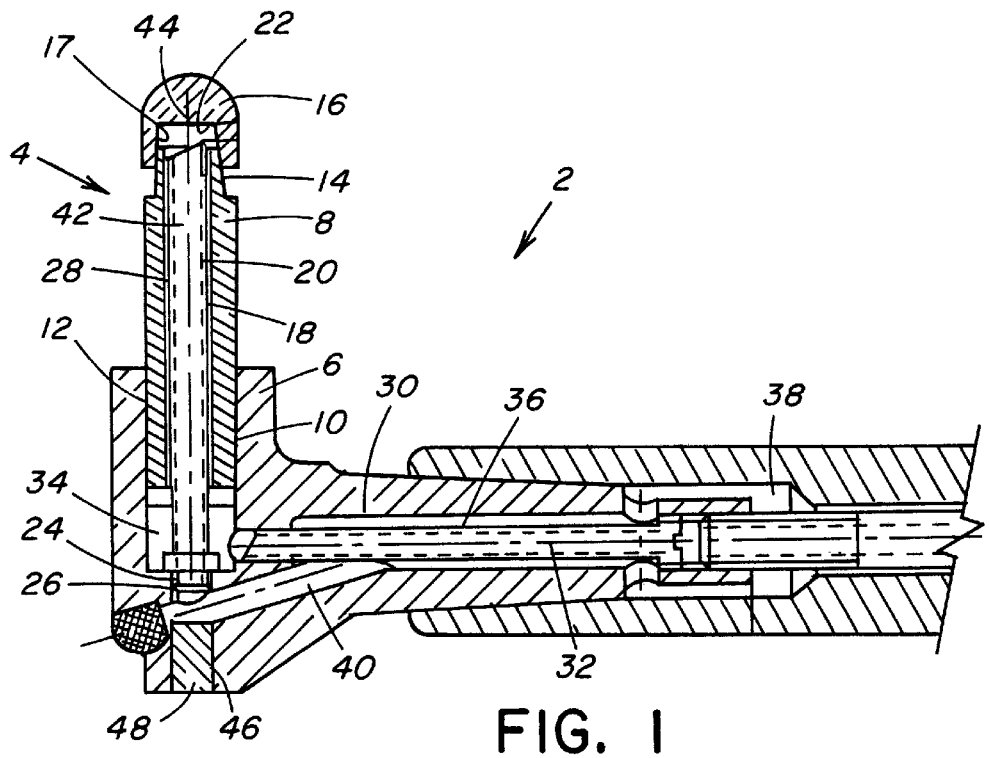
FIG. 1 is a sectional side view of a first embodiment example of a configuration according to the invention, and FIG. 2 in the same representation as in FIG. 1 is a second embodiment example of the configuration according to the invention.

In the Figures of the drawing identical or corresponding structural components are denoted by identical reference symbols.

In FIG. 1 is depicted a first embodiment example of a configuration 2 according to the invention, in which a welding electrode 4 is retained by an electrode holder 6. The welding electrode 4 comprises an electrode shaft 8, which is retained with an outer surface 10 tapering conically toward its one end in a conical inner surface 12 of the electrode holder 6. At its end, facing away from the electrode holder 6, the electrode shaft 8 comprises a further outer surface 14 tapering conically on which an electrode cap 16 with a conical inner surface 17 is held.

The electrode shaft 8 comprises a central bore 18, through which extends a tube component 20 coaxial with the bore 18, which in a manner to be described in further detail in the following, serves for supplying a cooling means to an inside 22 of the electrode cap 16. The tube component 20 is provided on its end facing away from the electrode cap 16 with outer threads 24, with which it is screwed into a threaded bore 26 of the electrode holder 6. The outer diameter of the tube component 20 is less than the clearance inner width of the bore 18 of the electrode shaft 8, such that between the inner wall of bore 18 and the outer wall of the tube component 20 an annular gap 28 is formed for the outlet of the cooling means from the inside 22 of the electrode cap 16.

The electrode holder 6 comprises a bore 30 extending perpendicularly to the central bore 18 of the electrode shaft 16, through which extends a second tube component 32, which is connected with an annular chamber 34 connected with the annular gap 28 and which serves for the outlet of cooling means from the electrode cap 16. In the region of its end facing the annular chamber 34 the clearance inner width of bore 30 corresponds to the outer diameter of the second tube component 32, such that the second tube component 32 in this region is received tightly in the bore 30. In the region of its end facing away from the annular chamber 34 the bore 30 comprises a clearance inner width which is greater than the outer diameter of the second tube component 32, such that in this region between the inner wall of bore 30 and the outer face of the second tube component 30 an annular gap 36 is formed. The annular gap 36 at its end facing away from the annular chamber 34 is connected with an annular chamber 38 as well as with a supply channel 40, which is connected with a channel 42 formed in the first tube component.

In the region of the supply channel 40 the electrode holder 6 comprises a recess 46 coaxial with the longitudinal axis of channel 42 symbolized in FIG. 1 by a dot-dash line 44, which in this embodiment example is formed by a through-bore extending from the supply channel 40 to the outside of the electrode holder. In the recess 46 a test head 48 is received in the electrode holder 6, which during operation of the configuration 2 generates longitudinal ultrasonic waves and irradiates them into the channel 42, wherein the longitudinal ultrasonic waves propagate in the axial direction of channel 42 from the test head 48 to the electrode cap 16.

The test head 48 in this embodiment example is plugged into the recess 46. However, it can also be adhered in the recess 46 or be screwed with outer threads into inner threads of the recess 46.

The test head 48 with the ultrasound transmitter is connected via feed lines not depicted in the drawing with a control circuit also not shown in the drawing, which drives the test head 48 during operation of the configuration 2 such that the ultrasound transmitter generates ultrasonic waves with a presettable wavelength or frequency, which can be for example in the range from approximately 5 to approximately 25 MHz.

The operational function of the configuration 2 is as follows:

during operation of the configuration two or several parts to be welded to one another are disposed between the electrode cap 16 of the welding electrode 4 and an electrode cap of a further welding electrode not shown in the drawing. Via the electrode caps 16, over means not further shown in the drawing but known to a person skilled in the art, a welding current is introduced into the welding region such that in the welding region a welding spot develops.

For testing the weld joint forming herein, the ultrasound transmitter of the test head 48 radiates substantially longitudinal ultrasonic waves into channel 42, which propagate along the longitudinal axis 44 of the channel 42 to the electrode cap 16 and through it into the welding region and permeate through the welding region. After the permeation of the welding region and damping in the welding region the ultrasonic waves are received by a further test head disposed on the other welding electrode with an ultrasound receiver, not shown in the drawing. The further test head can be disposed on the other welding electrode in a manner similar to the test head 49 on the welding electrode 4.

The ultrasonic waves received by the ultrasound receiver can be evaluated continuously during the welding process in order to obtain information about the course of the welding process and, if appropriate, adapt the parameters of the welding process, for example the welding current and/or the welding time such that a reliable weld joint is attained.

During the welding process to the electrode cap 16 is supplied cooling water as cooling means, which flows from a cooling means store, not shown in the drawing, via the annular chamber 38 and the annular gap 36 into the supply channel 40 and from there through the channel 42 in the interior of the first tube component 20 to the inside 22 of the electrode cap 16 and cools it. After the cooling of the electrode cap 16 the heated cooling water flows from the inside 22 of the electrode cap 16 through the annular gap 28 into the annular chamber 34 and from there through the interior of the second tube component 32 back to the cooling means store not shown in the drawing.

Channel 42 serves according to the invention thus, on the one hand, for supplying cooling water to the electrode cap 16, on the other hand, also as sound channel for the propagation of the ultrasonic waves radiated by the ultrasound transmitter of the test head 48.

Since the ultrasonic waves in their propagation through the cooling water flowing in channel 42 are damped or reflected only to a small extent, an evaluation is made possible of the ultrasonic waves after permeation of the welding region with high amplitude and thus high accuracy.

By attaching the test head 48 in the interior of the electrode holder 6, the test head 48 is reliably protected against mechanical damage. Thereby that the recess 46 is accessible from the outside, the test head 48 can, if needed, be removed in rapid and simple manner.

If, instead of a permeation signal, a reflection signal of the ultrasonic waves reflected on the welding region is to be measured, the test head 48 can comprise, in addition to an ultrasound transmitter, an ultrasound receiver, which receives ultrasonic waves reflected on the welding region or on the boundary surfaces of the structural parts to be welded.

Figure 2:
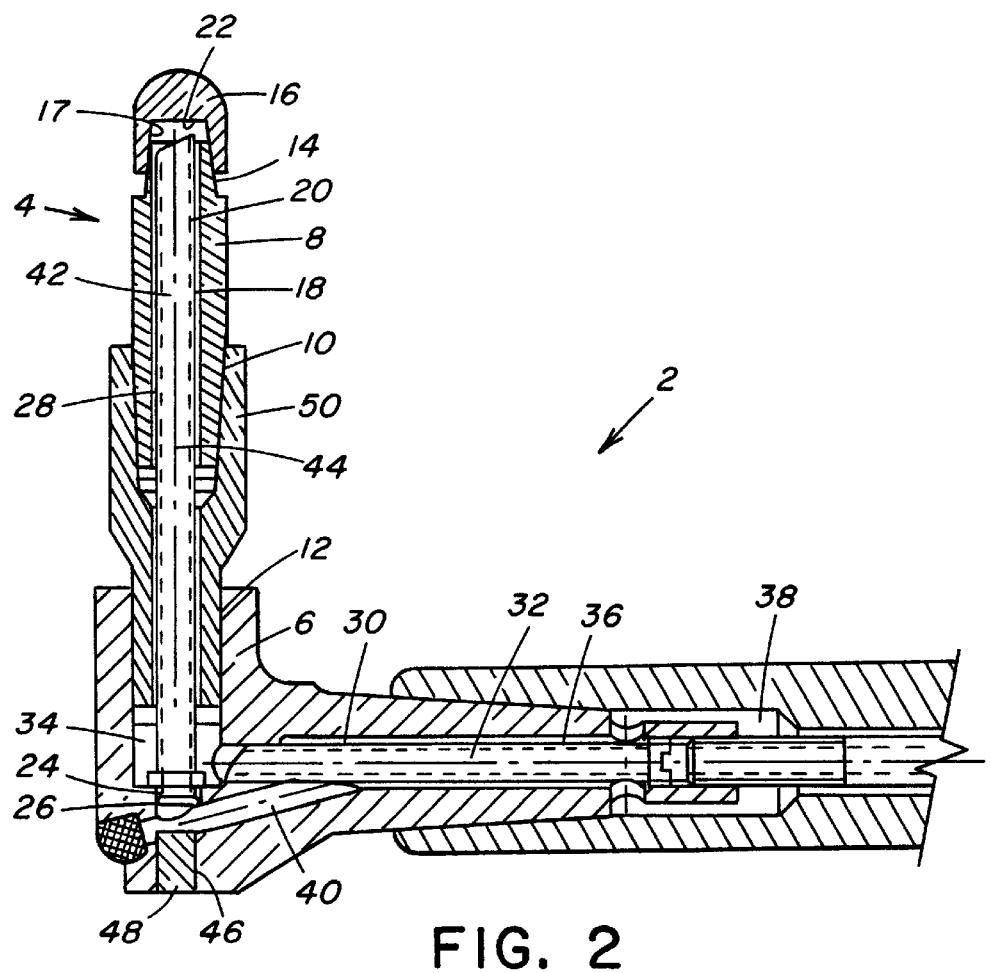

In FIG. 2 a second embodiment example of the configuration 2 according to the invention is depicted, which essentially differs from the embodiment example according to FIG. 1 thereby that the electrode shaft 8 of the welding electrode 4 is not directly connected with the electrode holder 6 but via an extension component 50.

The type of supply of cooling means to the electrode cap 16 depicted in FIGS. 1 and 2, is also applicable with welding electrodes which do not comprise a test head 48, thus, in which no testing of the weld joint takes place during the welding process.

What is claimed is:

1. Welding electrode assembly, comprising:
   (a) a welding electrode including an elongated electrode shaft having opposite outer and inner ends and defining an elongated channel extending axially between said outer and inner ends and an electrode element mounted to said outer end of said electrode shaft;
   (b) an electrode holder having an interior cavity receiving said inner end of said electrode shaft so as to mount said welding electrode to said electrode holder with said channel of said electrode shaft in communication with said interior cavity of said electrode holder;
   (c) an ultrasonic transmitter or an ultrasonic receiver mounted to said electrode holder in a spaced relationship from said inner end of said electrode shaft for radiating or receiving ultrasonic waves through said interior cavity of said electrode holder and said channel of said electrode shaft to or from said electrode element; and
   (d) means defined on said electrode holder between locations of said ultrasonic transmitter or said ultrasonic receiver and said inner end of said electrode shaft and provided in communication with said interior cavity of said electrode holder for filling said interior cavity of said electrode holder and said channel of said electrode shaft with a fluid medium.

2. The assembly of claim 1 wherein said ultrasonic transmitter or said ultrasonic receiver is substantially aligned with a longitudinal axis of said channel of said electrode shaft.

3. The assembly of claim 1 wherein said welding electrode further includes an elongated hollow tube disposed in said channel of said electrode shaft through which the ultrasonic waves are radiated or received through said channel.

4. The assembly of claim 3 wherein said tube has an end mounted to said electrode holder and extends therefrom into said channel of said electrode shaft.

5. The assembly of claim 1 wherein said ultrasonic transmitter radiates the ultrasonic waves at a frequency of approximately 5 to 25 MHz.

6. The assembly of claim 1 wherein said fluid medium is a sound-transmitting medium.

7. The assembly of claim 1 wherein said fluid medium is a cooling medium.

8. The assembly of claim 1 wherein said channel of said electrode shaft has a length and is substantially constant in cross section over the length of said electrode shaft.

9. The assembly of claim 1 wherein said electrode element is an electrode cap.

10. The assembly of claim 1 wherein said electrode holder has a recess defined therein and open to the exterior of said holder such that said ultrasonic transmitter or said ultrasonic receiver is pluggable into said recess from outside of said holder.

* * * * *